May 24, 1949. E. W. MARLOWE ET AL 2,470,895
IMPULSE TYPE POWER SUPPLY
Filed Dec. 13, 1945 3 Sheets-Sheet 1

WITNESSES.

INVENTORS.
ELBERT W. MARLOWE AND
BY HOWARD A. WILCOX

Patented May 24, 1949

2,470,895

UNITED STATES PATENT OFFICE 2,470,895

IMPULSE TYPE POWER SUPPLY

Elbert W. Marlowe, Chicago, Ill., and Howard A. Wilcox, Los Alamos, N. Mex., assignors to the United States of America as represented by the United States Atomic Energy Commission Application December 13, 1945, Serial No. 634,867

1 Claim. (Cl. 320—1)

This invention relates to an electronic power supply circuit.

More particularly the invention relates to an electronic circuit for supplying operating potential at high current capacity during predetermined short time intervals to an electrical system, and for regulating the value of said potential within close limits.

It is a primary object of the present invention to provide a power supply capable of delivering a substantial peak power, the average power capacity of which may be comparatively small.

Another object is to provide an electronic power supply the output of which comprises voltage pulses of substantially rectangular waveform with regulated amplitude and high current capacity.

Still another object is to provide a pulse type power supply, the output pulses of which have regulated and adjustable amplitude, and accurately controlled and adjustable duration.

A still further object of the invention is to provide a power supply capable of providing a regulated gate voltage of high current capacity superposed upon a D. C. base voltage.

Other objects and advantages of the present invention will become apparent to persons skilled in the art upon examination of the following description and appended drawings forming a part of this specification.

Figure 1:
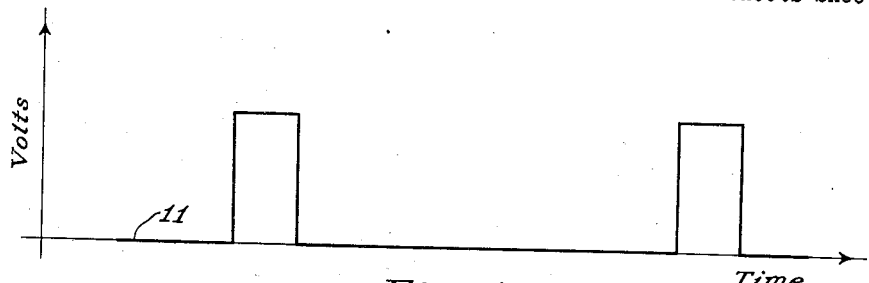
Figures 1, 2, 3 and 6 are illustrations of various voltage waveforms plotted as functions of time, to be described later.

Many types of electric apparatus require for their operation a supply voltage which is effectively applied only during brief intervals of time. Such a supply voltage, when plotted as a function of time, is characterized by a waveform consisting of a series of substantially rectangular pulses, as illustrated in Figure 1 of the drawings. Figure 1 represents the ideal voltage waveform, the waveform obtainable in practice being illustrated in Figure 2. As illustrated, the practical waveform differs from the ideal by having finite rise and fall times and a sloping top.

Figure 2:
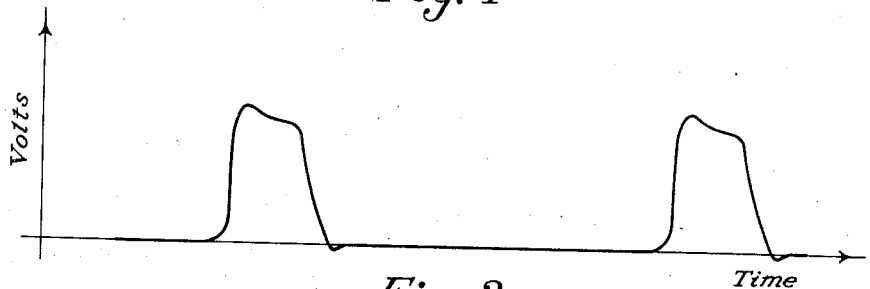

Pulses of the type illustrated in Figures 1 and 2 may be either positive or negative with respect to the reference voltage represented at 11 in Figure 1.

Figure 3:
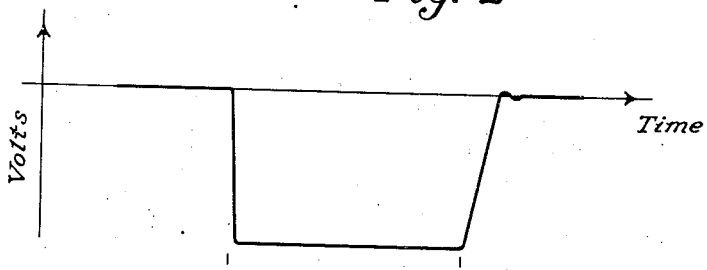

As shown in Figure 2, objectionable features of the hitherto realizable waveforms include a relatively long rise time, a sloping top and a relatively long decay. Figure 3 shows to an extended time scale the waveform of a single pulse obtained in accordance with operation of an embodiment of the invention. The pulse is negative with respect to the reference voltage, has a rate of "rise" of 3500 volts per microsecond, a duration of 100 microseconds, an amplitude of 500 volts with regulation from beginning to end of better than 5 per cent, and a total elapsed time for decay or less than 15 per cent of the pulse duration. The total elapsed time for the voltage to change from the reference value to the desired pulse amplitude is not greater than 2 microseconds at the start of the pulse.

The reference voltage may be positive, negative or zero with respect to ground. A voltage pulse of the type illustrated in Figures 1, 2, and 3 is often referred to as a "gate" voltage, it being the function of the pulse or "gate" to render associated apparatus operative for the time interval determined by the duration of the pulse of "gate." Typical values for the duration of such a pulse or for the interval between pulses are one ten thousandth of a second and one hundredth of a second, respectively.

In general, apparatus requiring such a supply voltage will draw appreciable power from the voltage source only during the time interval defined by the applied voltage pulse. It is therefore uneconomical to provide a voltage supply of a capacity to deliver continuously the required peak power.

One problem associated with pulse type power supplies arises when it is required that the amplitude of successive pulses be regulated to within close limits and adjustable to a predetermined value. Further difficulties are encountered when it is required that the gate voltage be superposed upon a steady biasing or "base" voltage.

Another problem arises when it is desired that the pulse amplitude be adjustable over a range of values, together with the pulse duration, while maintaining the regulation of the amplitude and the short rise and fall times. Controlling pulse length in a manner to insure successive pulses having equal durations also presents difficulties, especially when the pulse duration is adjustable.

Figure 4:
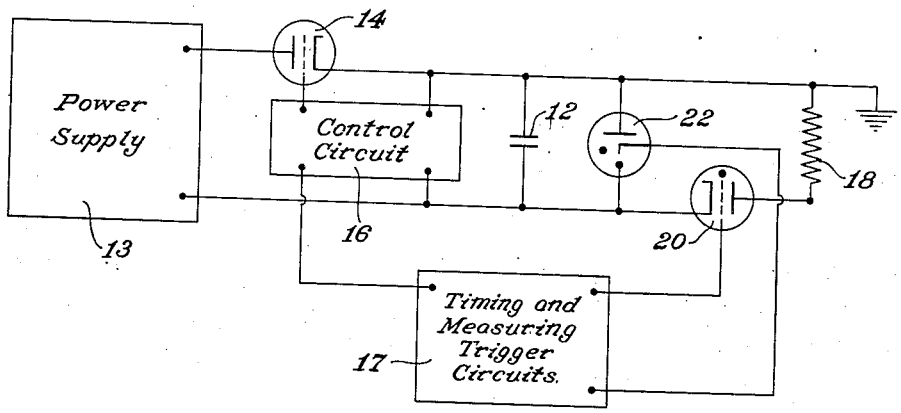
Figure 4 is a circuit diagram partially in block and partially in schematic form, representing an embodiment of the invention.

Briefly the manner in which the regulated gate voltage is generated by the apparatus of the invention is as follows:

Referring to Figure 4, there is shown partially in block diagram and partially in schematic diagram the essential features of a circuit particularly adapted to accomplish the objects of the invention. A capacitor 12 is associated in a series circuit with a voltage source or power supply 13 and a triode vacuum tube 14. Tube 14 is adapted to perform the function of a switch and a variable resistor in series between the source 13 and the capacitor. A control circuit 16 is associated with capacitor 12 and tube 14 in a manner to control the operation thereof.

The cycle of operation is initiated in response to a voltage pulse arising in a timing circuit 17 associated with the control circuit 16. In response to the above mentioned pulse, circuit 16 operates to remove control grid bias in tube 14 which then becomes conductive and permits the source 13 to charge capacitor 12. This constitutes the first step of the cycle of operation.

In order to allow rapid charging of capacitor 12, tube 14 is at first biased to obtain maximum current conduction therethrough. Also in order to obtain rapid charging of capacitor 12, the output voltage of source 13 is appreciably larger than the voltage to which it is desired to charge capacitor 12. However, in order to insure charging of capacitor 12 to the desired value, control circuit 16 is actuated in response to approximately ninety percent of full charge on capacitor 12 in a manner to control the value of the resistance to charging current presented by tube 14 by regulating the potential of the control grid thereof. This is the second step of the cycle.

Before capacitor 12 may be discharged through the load it must first be disconnected from the source of charging current 13; this is accomplished effectively by returning tube 14 to its original cutoff condition in response to a voltage pulse arising in circuit 17 and transmitted to the control circuit 16. This is the third step.

With a slight delay after biasing of tube 14 to cutoff, discharge of capacitor 12 through a load resistance 18 is initiated by triggering of a grid-controlled gaseous discharge tube 20, connected as shown in series between the capacitor 12 and the load 18, constituting the fourth step in the operation cycle.

Establishment of conduction in tube 20 causes the voltage to which capacitor 12 is charged, minus the small voltage drop across tube 20 when conducting, to appear across resistor 18. Capacitor 12 continues to discharge through tube 20 and resistor 18, the combination having a time constant (R×C seconds) long compared to the desired gate voltage duration.

Termination of the gate voltage is effected upon the establishment of conduction in a gaseous discharge tube 22, which may be of the ignitron type, connected directly in parallel with capacitor 12. This is the fifth step of the cycle.

Tube 22 is adapted to carry a relatively large current with low resistance when conducting; capacitor 12 therefore discharges rapidly through tube 22 when conduction is initiated therein, terminating the discharging of capacitor 12 through load 18. When capacitor 12 is nearly completely discharged the anode to cathode voltage difference on tubes 20 and 22 is no longer sufficient to maintain current conduction in either tube and the tubes extinguish, completing the cycle of operation.

Figure 5:
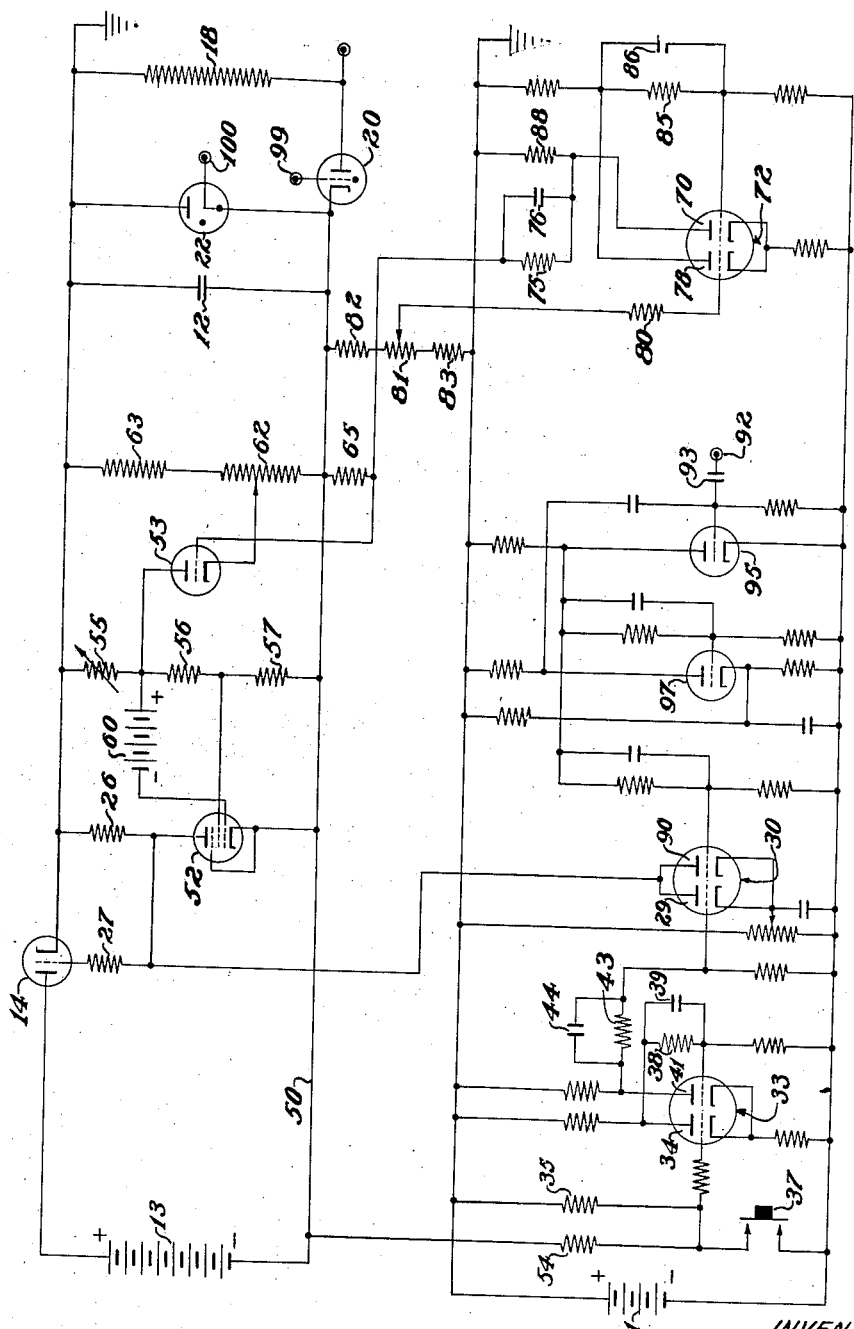
Figure 5 is a more complete schematic circuit diagram of the circuit of Figure 4.

Referring to Figure 5, the capacitor 12, power supply 13, load 18 and tubes 14, 20 and 22 are shown in a schematic circuit diagram together with cooperating elements illustrating an embodiment of the invention. Power supply 13 is illustrated for convenience as a battery; in practice a suitable rectified alternating current power supply may be employed. As mentioned above the cycle of operation commences with tube 14 in the cut-off condition. This condition may be maintained by current in a resistor 26 connected between the cathode and control grid of tube 14, in series with a current-limiting resistor 27. The said current in resistor 26 is due to conduction in a triode section 29 of a duo-triode tube 30 connected as shown with resistor 26 in series between the anode of triode 29 and the cathode of tube 14. Operating potential for triode 29 is supplied from a voltage source 31, shown for convenience as a battery although any suitable source may be employed. Source 31 is connected to maintain a negative potential with respect to ground at the cathode of triode 29.

To perform the first step of the cycle outlined above, i. e. turning tube 14 on, triode 29 must be rendered cutoff to remove the voltage drop across resistor 26. Conduction in triode 29 is determined by the condition of a control circuit including a duo-triode tube 33 connected as shown between ground and the negative terminal of voltage source 31. The triode portion 34 of tube 33 is normally conducting due to the connection of its control grid to ground through a resistor 35. It should be remembered that in this circuit ground is the positive side of the system. Triode 29 may be rendered cut off, and hence tube 14 turned on, by closing a two-point "make" switch 37, which momentarily connects the control grid of triode 34 to the negative terminal of source 31.

Closing of switch 37 drives triode 34 to cut-off, increasing the anode potential therein. This increased anode potential is transmitted through a parallel connection of a resistor 38 and a capacitor 39 to the control electrode of triode 41 which comprises the other half of duo-triode tube 33. The positive potential appearing at the control electrode of triode 41 causes conduction to be initiated therein, thus lowering the anode potential and causing the potential of the control grid of triode 29 to be driven below cutoff due to its connection to the anode of triode 41 through a resistor 43 and a capacitor 44 in parallel.

Driving triode 29 to cutoff removes the potential drop appearing across resistor 26 connected in the anode circuit of that tube. Removal of the voltage drop across resistor 26 removes the bias from tube 14 and permits current conduction in that tube from source 13 to charge capacitor 12.

Charging of capacitor 12 causes a potential to appear on conductor 50, the said potential being negative with respect to ground and increasing exponentially as capacitor 12 becomes charged. This potential is applied to supply operating potential to a pair of vacuum tubes 52 and 53 connected effectively between conductor 50 and ground, as well as to gaseous discharge tubes 20 and 22. This negative potential is also transmitted from conductor 50 to the control grid of triode 34 through a resistor 54 connected in series therebetween, causing triode 34 to remain cut off even though push-button 37 be released.

The second step of the cycle is to regulate the potential to which capacitor 12 is charged. This is accomplished in conventional manner by regulating the current in tube 14, but, as mentioned above, tube 14 is at first without any bias in order to permit rapid charging of capacitor 12. The tube 52 is provided to control conduction in tube 14 in response to the potential appearing across capacitor 12 by determining the amount of current in, and hence the voltage drop across, resistor 26. The said voltage drop comprises the control grid bias for tube 14, and hence is operable to determine the current conduction in that tube. Tube 52 is thus connected to operate in conventional manner as the controlling tube in a degenerative type voltage regulating circuit.

As mentioned above, charging of capacitor 12 applies operating potential to the tube 52. As shown, a voltage dividing resistor network, comprising a rheostat 55, a resistor 56 and a resistor 57 connected in series, is connected in parallel with capacitor 12. The control grid of tube 52 derives its potential from the point between rheostat 55 and resistor 56, a potential source 60 being provided in series to secure the proper potential level at the control grid of tube 52. Rheostat 55 also comprises the anode load resistor of the tube 53, which is also connected in parallel with capacitor 12. Bias for tube 53 is obtained from the connection of its cathode to a potentiometer 62, connected in series with a resistor 63 across capacitor 12, the grid of tube 53 being returned to conductor 50 through a resistor 65. This bias is adjusted to insure conduction in tube 53 upon application of operating potential thereto.

Conduction in tube 53 causes a potential drop across rheostat 55 which maintains tube 52 cut off and inoperable for voltage regulation even though operating potential has been applied to that tube. Tube 14 is thus without bias to permit a maximum rate of charging of capacitor 12, and tube 52 is inoperable as a voltage regulator, until such time as the voltage drop across rheostat 55 is removed.

To render tube 52 operative for voltage regulation the voltage drop appearing across rheostat 55, due to current drawn therethrough by the tube 53, must be removed. This second step in the operation cycle is accomplished, when capacitor 12 has reached approximately 90% of the desired state of charge, in the following manner. The control grid of tube 53 is also connected to the anode of triode section 70 of a duo-triode tube 72 connected between ground and the negative terminal of source 31. A parallel circuit comprising a resistor 75 and a capacitor 76 is interposed in series between the anode of triode 70 and the control grid of tube 53. A triode section 78, comprising the other half of the duo-triode tube 72, is the normally conducting section of this pair of triodes by reason of the connection of its control grid through a current limiting resistor 80 to the tap of a potentiometer 81 connected in series between a resistor 82 and a resistor 83, the series combination being connected as shown between ground and conductor 50.

The values of resistors 82 and 83, together with the setting of the tap of potentiometer 81, are chosen to cause the control grid of triode 78 to be carried below cutoff, due to the increasingly negative potential of conductor 50, at the time that capacitor 12 is approximately 90% charged. Cutoff in triode 78 causes triode 70 to become conducting due to the interconnection of the cathodes of the two sections and the connection of the control grid of triode 70 to the anode of triode 78 through a network comprising a resistor 85 and a capacitor 86 connected in parallel. Initiation of conduction in triode 70 causes a decrease in the potential at the anode thereof due to current in a resistor 88 connected between that anode and ground. This decrease in potential at the anode of triode 70 is transmitted to the control grid of tube 53, causing that tube to cut off and removing the potential drop across rheostat 55 which was due to conduction in tube 53. Cutoff bias is thus removed from tube 52 and that tube then functions in conventional manner to control current conduction through tube 14, and regulate the potential across capacitor 12 at the desired value.

The third step of the operating cycle, i. e. disconnecting capacitor 12 from the source of charging current, is accomplished in the following manner. The cutoff condition originally existent in tube 14 is reestablished by initiating conduction in a triode 90 which comprises the other half of duo-triode tube 30.

This action may be initiated in response to a negative voltage pulse arising in an associated control circuit, not shown, and applied to an input terminal 92 connected through a capacitor 93 to the control grid of a vacuum tube 95. The tube 95 is associated with a tube 97 in a known manner whereby current conduction in either tube operates to hold the other tube cut off, and the circuit in the steady state returns to a condition in which one of the tubes is the normally conducting tube. In this instance tube 95 is the normally conducting tube, and tube 97 is normally non-conducting or cut off; the negative pulse introduced at terminal 92 operates in a manner familiar to persons skilled in the art to reverse the status of tubes 95 and 97 with respect to current conduction, causing the potential at the anode of tube 95 to rise, which rise is transmitted to the control grid of triode 90, initiating conduction therein. Conduction in triode 90 causes a potential drop to appear across resistor 26 connected in the anode circuit of that tube, applying cutoff bias to the tube 14 and hence effectively disconnecting capacitor 12 from the source of charging current 13.

The fourth step in the cycle of operation is initiated in time delay relation to the third step, which comprises disconnecting capacitor 12 from source 13 by driving tube 14 to cutoff. This fourth step, comprising initiating discharging of capacitor 12 through the load, represented by the resistor 18, is effected in response to the application of a positive voltage pulse to a terminal 99 connected as shown to the control electrode of the gaseous discharge tube 20, which is preferably of the thyratron type. The said positive voltage pulse arises in an associated control circuit, not shown, and is delayed with respect to the negative pulse applied as mentioned above to the terminal 92. Conduction in tube 20 is normally prohibited, despite a considerable applied anode to cathode voltage, by the application of a suitable negative bias to the control electrode. Accordingly, provision is made in a known manner for normally maintaining the control electrode of tube 20 at a negative voltage sufficient to prevent conduction therein until the above mentioned positive pulse is applied to terminal 99.

Once conduction is established in tube 20 the control electrode thereof loses control and conduction continues until the applied anode to cathode voltage is no longer sufficient to sustain the discharge originally initiated. The tube 20, therefore, constitutes a switch to make connection between capacitor 12 and load 18 in response to a positive voltage pulse applied to terminal 99. When this connection is first made, the full voltage to which capacitor 12 is charged, minus the small drop across tube 20 when conducting, appears essentially instantaneously across load 18, resulting in an extremely short pulse rise time. Too rapid decay of the voltage appearing across load 18 is prevented by selecting the time constant of capacitor 12 and load (resistor) 18, (R×C seconds), to be long compared to the desired gate duration.

Figure 6:
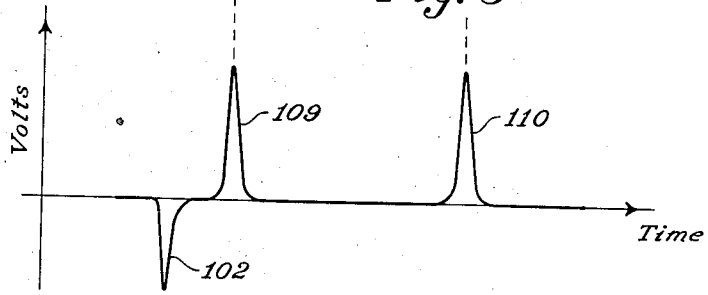

The fifth and final step of the cycle, that of terminating the discharge of capacitor 12 through load 18, is effected by initiating conduction in the gaseous discharge tube 22, connected directly across the terminals of capacitor 12. Discharge of capacitor 12 through the tube 22 is effected in response to the application of a positive voltage pulse to a terminal 100, connected as shown to the control electrode of tube 22. This positive voltage pulse may be derived from an associated control circuit which may also be the source of the negative pulse applied to terminal 92 and the positive pulse applied to terminal 99. The desired output of such a control circuit is illustrated in Figure 6 to show the time relationship of the several pulses. The pulse designated 102 in Figure 6 represents the pulse applied to terminal 92. The pulse designated 109 represents the pulse applied to terminal 99 to start the output voltage pulse, or "gate"; and that designated 110 represents the pulse applied to terminal 100 to terminate the "gate." Figure 6 is to be examined with reference to Figure 3; it is seen that the pulse 109 corresponds in time to the beginning of the gate voltage of Figure 3, and the pulse 110 to the end thereof, while pulse 102 corresponding to disconnecting the capacitor 12 from the source 13, precedes the start of the gate voltage of Figure 3. Circuits for generating a series of pulses as shown in Figure 6 are well known to persons skilled in the art and the circuit diagram has been simplified by omitting the representation of such a circuit here.

Returning to Figure 4 and the discussion of the circuit operation, conduction having been initiated in gaseous discharge tube 22, which is preferably of the ignitron type, the said tube then constitutes an effective short-circuit across the capacitor 12, rapidly draining the remaining charge therefrom. Once capacitor 12 is nearly completely discharged, the potential across tubes 20 and 22 is sufficiently lowered to quench these tubes. Operating potential is also removed from tubes 52 and 53 due to the discharged condition of capacitor 12 and the circuits of triode 34 and triode 78 return to their original condition. After a short time interval the circuit including tubes 95 and 97 relaxes and the original condition is restored with tube 95 conducting and tube 97 non-conducting. The circuit as a whole is then ready for a succeeding cycle of operation and the steps outlined above may be retraced.

When it is desired that output voltage pulses or "gates" be generated automatically at a definite repetition rate, switch 37 may be left permanently closed and the series of pulses illustrated in Figure 6 is then repeated at the desired repetition rate.

Figure 7:
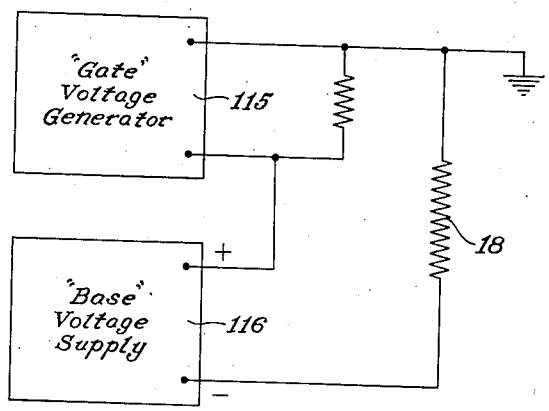
Figure 7 is a block diagram of an embodiment of another form of the invention.

The circuit is readily adapted for superposition of the "gate" voltage upon a steady biasing or base voltage. Figure 7 illustrates a circuit connection to provide superposition of the "gate" voltage upon a base voltage which is negative with respect to ground. As shown in Figure 7 the "gate" voltage generator 115 is connected between the ground and the positive terminal of a "base" voltage supply 116, the load 18 being connected between the negative terminal of supply 116 and ground. The generator 115 operates to lower suddenly the potential of the positive terminal of supply 116 with respect to ground, but since supply 116 operates to maintain a constant potential difference between its output terminals, the "gate" voltage is superposed upon the "base" voltage and applied to the load 18.

While the above description presents the features of a presently preferred embodiment of the invention, modifications and adaptations thereof will be readily apparent to persons skilled in the art; the scope of the invention being limited only by the appended claim which defines with particularity the inventive aspects.

We claim:

In an electronic circuit, a capacitor, a source of potential for charging said capacitor, an output circuit, control and regulating means intermediate said source and said capacitor for controlling the initiation and termination of charging and rate of charging of said capacitor and responsive to a predetermined signal to prevent the passage of charging potential to said capacitor immediately prior to discharge, means associating said capacitor and said output circuit and adapted to be responsive to a predetermined signal to permit discharge of said capacitor through said output circuit, means in shunt with said output circuit and responsive to a predetermined signal effectively to short circuit said capacitor, and signal producing means for supplying successive signals in predetermined time relationship respectively to said control means, said means associating said capacitor and said output circuit and said short circuiting means, said signal to said short circuiting means being supplied prior to complete discharge of said capacitor.

ELBERT W. MARLOWE.
HOWARD A. WILCOX.

REFERENCES CITED

The following references are of record in the file of this patent:

UNITED STATES PATENTS

| Number | Name | Date |
|---|---|---|
| 2,235,385 | Rava | Mar. 18, 1941 |
| 2,250,102 | Klemperer | July 22, 1941 |
| 2,294,388 | Dawson | Sept. 1, 1942 |
| 2,295,293 | Rogers | Sept. 8, 1942 |
| 2,385,736 | Smith et al. | Sept. 25, 1945 |
| 2,426,710 | Sanders | Sept. 2, 1947 |
| 2,427,687 | Norgaard | Sept. 23, 1947 |